US011288290B2

(12) United States Patent
Radivojevic et al.

(10) Patent No.: US 11,288,290 B2
(45) Date of Patent: Mar. 29, 2022

(54) BUILDING REPORTS

(71) Applicant: Ab Initio Technology LLC, Lexington, MA (US)

(72) Inventors: Dusan Radivojevic, North Andover, MA (US); Peter Moss, Bedford, MA (US)

(73) Assignee: Ab Initio Technology LLC, Lexington, MA (US)

( * ) Notice: Subject to any disclaimer, the term of this patent is extended or adjusted under 35 U.S.C. 154(b) by 690 days.

(21) Appl. No.: 14/717,633

(22) Filed: May 20, 2015

(65) Prior Publication Data

US 2016/0179930 A1 Jun. 23, 2016

Related U.S. Application Data (60) Provisional application No. 62/093,666, filed on Dec. 18, 2014.

(51) Int. Cl.
*G06F 16/00* (2019.01)
*G06F 16/28* (2019.01)
(Continued)

(52) U.S. Cl.
CPC ......... *G06F 16/288* (2019.01); *G06F 3/0482* (2013.01); *G06F 3/04842* (2013.01);
(Continued)

(58) Field of Classification Search
CPC ......... G06F 17/30604; G06F 17/30554; G06F 17/30297; G06F 17/30572; G06F 16/283;
(Continued)

(56) References Cited

U.S. PATENT DOCUMENTS 5,701,453 A * 12/1997 Maloney ........... G06F 17/30306
707/714
6,134,541 A 10/2000 Castelli et al.
(Continued)

FOREIGN PATENT DOCUMENTS

CN 103020158 9/2016
JP S62-173528 7/1987
(Continued)

OTHER PUBLICATIONS

Bowersox, "JPA: Determining the Owning Side of a Relationship", Apr. 11, 2013, www.javacodegeeks.com/2013/04/jpa-determining-the-owning-side-of-a-relationship.html. (Year: 2013).*
(Continued)

*Primary Examiner* — Chelcie L Daye
(74) *Attorney, Agent, or Firm* — Fish & Richardson P.C.

(57) ABSTRACT

Methods, systems, and apparatus, including computer programs encoded on computer storage media, for building reports. One of the methods includes creating a model based on relational structured data, the structured data including data structures, each data structure having data elements, each data element having fields, each field having a name. The method includes generating a hierarchy of objects in model, the hierarchy organizing objects the with respect to a starting object according to relationship fields on the objects. The method includes generating a user interface including elements for one or more of the objects in the hierarchy, wherein the user interface enables a user to create a report and filter the report using the new name. The method includes receiving a user selection of an element from the elements. The method also includes generating a report.

38 Claims, 8 Drawing Sheets

(51) Int. Cl.
*G06F 16/242* (2019.01)
*G06F 16/248* (2019.01)
*G06F 16/21* (2019.01)
*G06F 16/25* (2019.01)
*G06Q 10/10* (2012.01)
*G06F 3/0482* (2013.01)
*G06F 3/04842* (2022.01)

(52) U.S. Cl.
CPC ............ *G06F 16/21* (2019.01); *G06F 16/243* (2019.01); *G06F 16/248* (2019.01); *G06F 16/2423* (2019.01); *G06F 16/2448* (2019.01); *G06F 16/25* (2019.01); *G06Q 10/10* (2013.01)

(58) Field of Classification Search
CPC ...... G06F 16/288; G06F 16/21; G06F 16/243; G06F 16/2448; G06F 16/25; G06F 16/2423; G06F 16/248
USPC ......................................................... 707/792
See application file for complete search history.

(56) References Cited

U.S. PATENT DOCUMENTS

| | | | |
|---|---|---|---|
| 6,370,537 B1* | 4/2002 | Gilbert | G06T 11/206 |
| 6,418,427 B1 | 7/2002 | Egilsson et al. | |
| 6,714,940 B2 | 3/2004 | Kelkar | |
| 6,768,986 B2 | 7/2004 | Cras et al. | |
| 8,027,997 B2 | 9/2011 | Conn et al. | |
| 9,798,747 B2* | 10/2017 | Zhou | G06F 17/30292 |
| 2002/0023261 A1* | 2/2002 | Goodwin | G06F 8/30 717/146 |
| 2003/0041077 A1* | 2/2003 | Davis | G06F 40/143 715/205 |
| 2003/0069877 A1* | 4/2003 | Grefenstette | G06F 17/30643 |
| 2004/0034616 A1 | 2/2004 | Witkowski et al. | |
| 2004/0181538 A1* | 9/2004 | Lo | G06F 17/30592 |
| 2006/0116859 A1* | 6/2006 | Legault | G06F 17/30554 703/22 |
| 2006/0117057 A1* | 6/2006 | Legault | G06F 17/30297 |
| 2006/0195460 A1* | 8/2006 | Nori | G06F 16/252 |
| 2007/0005654 A1* | 1/2007 | Schachar | G06Q 10/00 |
| 2007/0226203 A1* | 9/2007 | Adya | G06F 16/2445 |
| 2009/0112920 A1* | 4/2009 | Conn | G06F 16/288 |
| 2009/0193050 A1* | 7/2009 | Olson | G06F 17/30592 |
| 2009/0228866 A1* | 9/2009 | Lochmann | G06F 8/74 717/107 |
| 2012/0239682 A1* | 9/2012 | Wedeniwski | G06F 17/30663 707/769 |
| 2012/0253793 A1* | 10/2012 | Ghannam | G06F 17/2785 704/9 |
| 2015/0066975 A1* | 3/2015 | Dos Santos | G06F 17/30294 707/769 |

FOREIGN PATENT DOCUMENTS

| | | |
|---|---|---|
| JP | H10-509264 | 9/1998 |
| JP | 2009003 549 | 1/2009 |
| WO | 2006/0643 83 | 6/2006 |

OTHER PUBLICATIONS

Bowersox, "JPS: Determining the Owning Side of a Relationship", Published Apr. 11, 2013; www.javacodegeeks.com/2013/04/jpa-determining-the-owning-side-of-a-relationship.html.*
International Search Report and Written Opinion, Application No. PCT/US2015/066335, dated Apr. 6, 2016 (14 pages).
International Preliminary Report on Patentability, Application No. PCT/US2015/066335, dated Jun. 20, 2017.
Japanese Office Action issued in Application No. JP2017-532792, dated Sep. 25, 2018.
CN Office action in Chinese Appln No. 201580069242.9, dated Mar. 4, 2020, 19 pages (With English translation).
CN Office Action in Chinese Appln No. 201580069242.9, dated Dec. 29, 2020, 17 pages (with English Translation).

* cited by examiner

BUILDING REPORTS

CROSS-REFERENCE TO RELATED APPLICATIONS

This application claims priority to U.S. Provisional Application Ser. No. 62/093,666, filed on Dec. 18, 2014, entitled "Building Reports," the entire contents of which are hereby incorporated by reference.

BACKGROUND

This description relates to building reports.

A database can store large quantities of information. The manner in which the information is stored is not always intuitive. Instead, the structure of the database is determined based on factors such as maintenance of referential integrity, speed of access, and redundancy minimization. Data which may be logically grouped together can be stored in separate entities. Complex relationships may be resolved by adding additional entities which do not have a physical counterpart.

SUMMARY

In general, an aspect 1 of the subject matter described in this specification can be embodied in methods that include the actions of creating a model based on structured data, the structured data including data structures, each data structure having data elements, each data element having fields, each field having a name. Creating the model includes creating an object in the model based on a data structure in the structured data, translating a name of a field in the data structure to a natural language name, creating a field on the object having the new name, and creating a relationship field on the object based on a relationship between data structures in the structured data. The method includes generating a hierarchy of objects in model, the hierarchy organizing objects the with respect to a starting object according to relationship fields on the objects. The aspect includes generating a user interface including elements for one or more of the objects in the hierarchy, wherein the user interface enables a user to create a report and filter the report using the new name. The method includes receiving a user selection of an element from the elements. The method includes generating a report including identifying a data structure corresponding to the element, obtaining data from at least one field in the identified data structure in the data source, and presenting the data to the user.

An aspect 2 according to aspect 1, wherein translating a name may include translating the name using a look up table.

An aspect 3 according to any of aspects 1 or 2, wherein the relationship field may be a reference field representing a relationship between one data element in the data structure to one second data element in a second data structure.

An aspect 4 according to any of aspects 1, 2, or 3, wherein the relationship field may be a collection field representing a relationship between one data element in the data structure to second data elements in a second data structure.

An aspect 5 according to any aspects 1, 2, 3 or 4, wherein the user interface may include aggregation functions that can be used on the collection field.

An aspect 6 according to any of aspects 1, 2, 3, 4, or 5, wherein the relationship field may be a parent-child field representing a relationship between one data element in the data structure to a second data element in the data structure.

An aspect 7 according to any of aspects 1, 2, 3, 4, 5, or 6, wherein the structured data may be a structured database and the data structure is a table in the structured database.

An aspect 8 according to any of aspects 1, 2, 3, 4, 5, 6, or 7, wherein the structured data may be one or more files.

An aspect 9 according to any of aspects 1, 2, 3, 4, 5, 6, 7, or 8, wherein generating the report may occur in response to receiving the user selection.

An aspect 10 according to any of aspects according to any of aspects 1, 2, 3, 4, 5, 6, 7, 8, or 9, wherein the user interface may enable an interactive creation of reports using a what-you-see-is-what-you-get interface and wherein the user interface may provide visual feedback of the report including data values in near-real-time prior to finalizing the report.

An aspect 11 according to any of aspects 1, 2, 3, 4, 5, 6, 7, 8, 9, or 10, wherein generating a user interface may further include receiving a selection of the starting object from a user.

An aspect 12 according to any of aspects 1, 2, 3, 4, 5, 6, 7, 8, 9, 10, or 11, wherein the natural language name may include at least one character in a set of restricted characters for the structured data.

An aspect 13 according to any of aspects 1, 2, 3, 4, 5, 6, 7, 8, 9, 10, 11, or 12, wherein creating a relationship field on the object based on a relationship between data structures in the structured data may include creating a relationship object to represent a primary key—foreign key relationship in the structured data.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

Aspects can include one or more of the following advantages. Reports can be updated in real time, allowing a user to immediately see the impact of the report. Reports can be created quickly.

Other features and advantages of the invention will become apparent from the following description, and from the claims.

DESCRIPTION

A reporting tools are computer programs whose purpose is to take data from a source such as a database, XML stream or a spreadsheet, and use it to produce a document in a format which satisfies a particular human readership. In traditional reporting tools, an expert user sets up a view that provides access to the data for a particular report or set of reports. Generally, views are set up by technical users who understand the structure of the underlying data (for example, the relational model of the database). The views are used and manipulated by a conventional report builder to generate the report. However, because setting up the views are a manual process, views typically reflect a small portion of the underlying data schemas or may be particular to a specific business problem.

In addition, these views generally do not present a user-friendly representation of the data. They usually present fields exactly as they are represented in the relational model, which may not be intuitive to end users of the reporting tool.

In contrast, the approach presented here involves two novel elements that make the process of creating reports much more intuitive, interactive and efficient for the end user.

First is the concept of creating a meta-model that describes relational data in business-friendly terms. Relationships are modeled in such a way as to create an intuitive hierarchical meta-model.

Second, a report builder application is used to present the meta-model in a highly interactive user interface (UI) to enable the user to create ad hoc and formal reports quickly and easily. The report builder UI provides instant feedback as the user creates the report. Columns can be added to the report via a drag and drop interface, and filters can be applied in simple straightforward manner. These features enable a user to quickly perform ad hoc investigative actions, and to create more formal reports for execution by a broad set of users.

The meta-model can be generated from either the underlying data source directly or from a specification that describes the underlying data. The meta-model identifies objects, fields of objects, relationships between the objects, and a mapping between the objects in the meta-model and the underlying data.

These relationships are symmetrical and can be navigated in either direction. For example, if a relationship enables the identification of orders based on a customer, then a corresponding relationship enables the identification of a customer based on an order.

Figure 1:
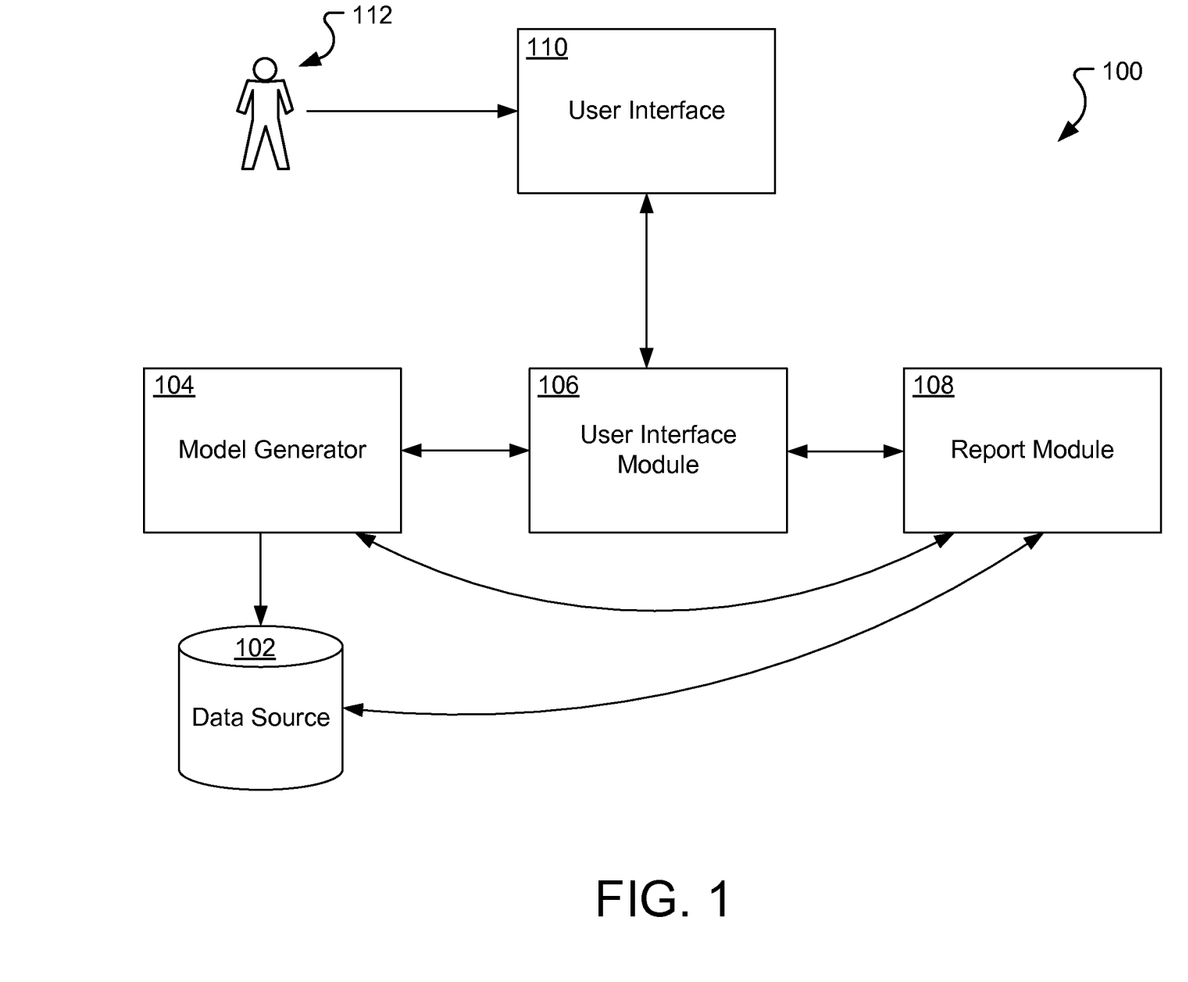
FIG. 1 illustrates an example of an environment for building reports.

FIG. 1 illustrates an example of an environment 100 for building reports. A data source 102 can be, for example, a relational database, an object database, a structured data file (such as a SGML or XML file), a hierarchical database, a data warehouse, or any other data storage system. In general, the data source 102 can be any data store in which data records can be identified and whose data records include values associated with individual fields.

Prior to the generation of a report, a model generator 104 can read the data source 102, or a specification that describes the data sources, and generate a meta-model, as described further below. The meta-model is generated once and saved for later use by the user interface. In general, the meta-model allows the user interface to present a business-friendly form of the data source. For example, the meta-model may reflect the constraints and relationships established in the data source that correspond to business concepts while eliminating or simplifying the constraints and relationships which are established for technical reasons.

Objects in the meta-model can include different kinds of fields. Ordinary fields are simple fields that provide data to a report, such as name, birth date, quantity, and description. Reference fields are fields that point to other objects in the meta-model. A reference field can be derived from foreign keys in the underlying data source. A meta-model can also include collection fields. Collection fields are logical representations of a collection of objects that are associated with another object. The relationship of the object to the objects in the collection is one-to-many. Generally, a reference field is used when the object is associated with at most one of the target objects and a collection field is used when the object can be associated with many of the target objects.

A user interface module 106 reads the meta-model generated by the model generator 104 and generates a user interface 110 for presentation to a user 112. The user interface module 106 can, for example, generate a webpage or application that is presented to the user 112 on a web browser executed on a client device.

The user 112 interacts with the user interface 110 to generate a report. For example, the user interface 110 may provide user selected report information to the user interface model 106. The user interface module 106 may provide the report information to the report module 108. The report module 108 executes the report against the data source 102. In some implementations, the report module 106 may generate the report using the report information and information from the model generator 104 (for example, a meta-model). The output of the report module 108 can be returned to the user interface 110 via the user interface module 116 for presentation to the user 112. This provides the user 112 with near-real-time (for example, with a latency of less than five seconds) results. This workflow enables the user 112 to see the impact of changes being made to the report as the report is being built.

Figure 2:
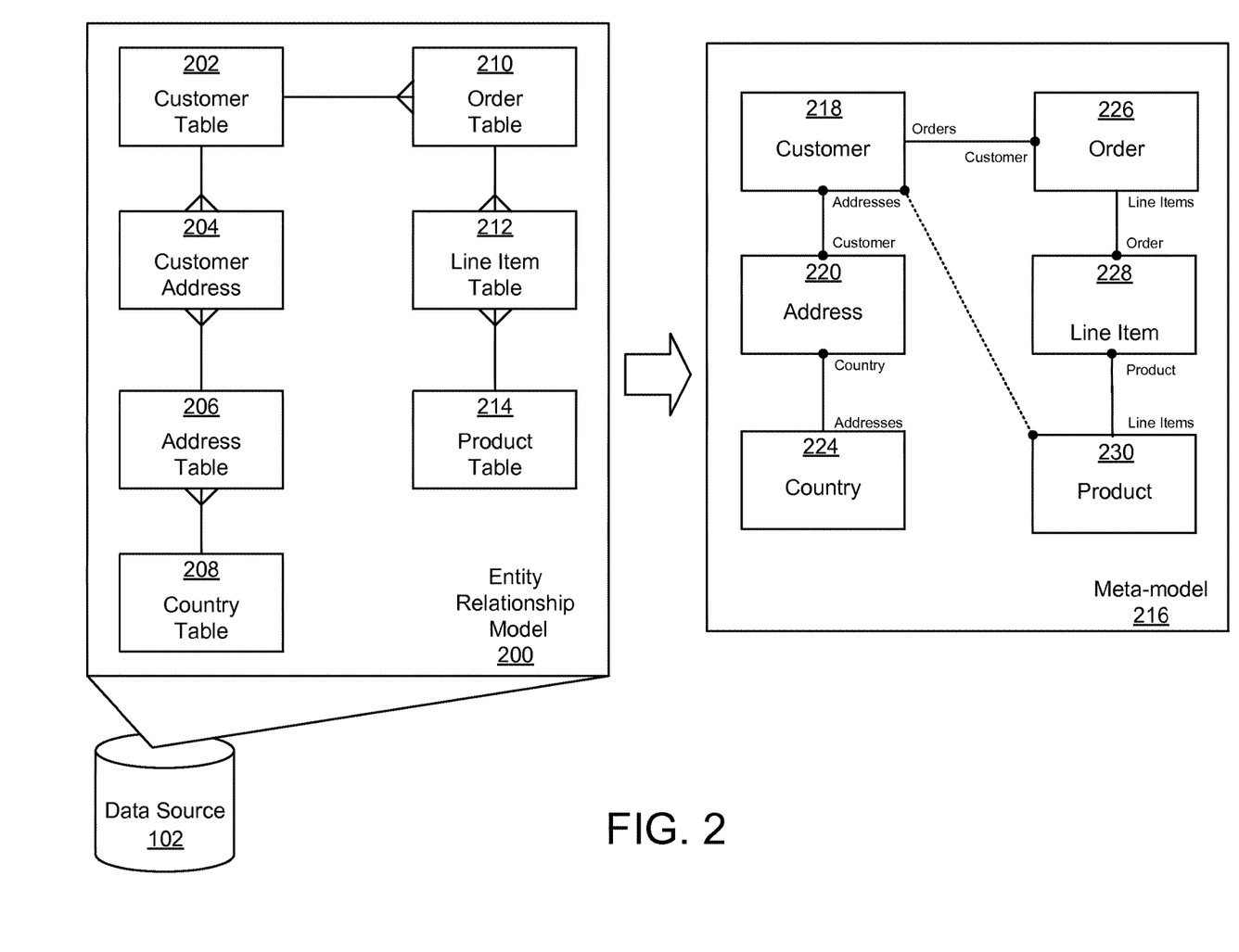
FIG. 2 illustrates an example of mapping a relational database into a meta-model.

FIG. 2 illustrates an example of generating a meta-model based on a relational database. In this example, the structure of the data source 102 is reflected in the entity relationship model 200. In general, relationships between rows of data in the tables may be established by including a foreign key in a row of data of one table which references a primary key in a row of data in a second table. Generally, the foreign key is stored on the side of a relationship that allows for multiple rows in the table with the foreign key to be associated with a single row in the table without a foreign key. The database can describe how one table relates to another. Relationships in a database can describe a number of elements in a relationship between two objects, commonly referred to as the cardinality of the relationship. "One-to-one" indicates that one row in table A relates to one row in table B. "One-to-many" indicates that one row in table A relates to many rows in table B. "Many-to-many" indicates that many rows in table A relate to many rows in table B.

In this example, a row in the customer table 202 can be related to many rows in the order table 210 and each row in the order table 210 can be related to only one row in the customer table 202. As described above, this relationship is created by the introduction of a foreign key in the order table that identifies a row in the customer table 202. Similarly, a row in the order table 210 can be related to many rows in the line item table 212, while a row in the line item table 212 can be related to only one row in the order table 210. A row in the product table 214 can be related to many rows in the line item table 212, while a row in the line item table 212 can be related to only one row in the product table.

A row in the customer table 202 can be related to many rows in the customer address table 204 and a row in the customer address table 204 can be related to one row in the customer table 202. A row in the customer address table 204 can be related to one row in the address table 206 and a row in the address table 206 can be related to many rows in the customer address table 204. A row in the address table 206 can be related to one row in the country table 208, while a row in the country table 208 can be related to many rows in the address table 206.

The creation of a physical database can include the introduction of a database table and relationships that only exist to simplify the management and maintenance of the database. For example, database normalization is the process of organizing the fields and tables of a relational database to minimize redundancy. Normalization usually involves dividing large tables into smaller tables and defining relationships between them. A normalized database isolates data so that additions, deletions, and modifications of a field can be made in just one table and then propagated throughout the rest of the database using the defined relationships. Database normalization can introduce tables that do not necessarily correspond to concepts readily understood by a business user. For example, normalized databases generally introduce tables to resolve many-to-many relationships. For example, a customer may have many addresses and many customers can reside at the same address; this many-to-many relationship between the customer table 202 and the address table 206 has been resolved through the introduction of a customer address table 204. These tables that serve only to resolve a many-to-many relationship between other tables may be referred to as link tables. In general, a link table may have little meaning to a business user.

A meta-model generator generates the meta-model 216. In general, the meta-model 216 describes the relationships between data elements in a manner that is more closely related to the business and less closely related to the physical implementations of the data set. The relationships in the meta-model are bi-directional. For example, a customer 218 has one or more addresses 220 and an address 220 has one or more customers 218. Similarly, a customer 218 has one or more orders 226 and an order 226 has one customer 218.

Relationships in the meta-model can be characterized as reference relationships, where the object is associated with only one other object (for example, the relationship between the order object 226 and the customer 218). Alternatively, relationships in the meta-model can be characterized as collection relationships (for example, the relationship between a customer 218 and orders 226).

The model generator may initially generate an object for tables in the relational database. The model generator can create fields on the object that correspond to fields in the underlying table. The model generator can also identify relationships between objects in the meta-model by analyzing the underlying data structures; for example, the model generator may identify a primary key-foreign key relationship between the customer table and the order table. Based on the presence of a foreign key to the customer table in the order table, the model generator creates a reference relationship between the order object and the customer object and a collection relationship between the customer object and the order object.

The names can be determined based on a predetermined naming convention. For example, a field in a database may be labeled using camel case to separate words (for example, "FirstName") or the field in the database may be named using underscores (e.g., "first_name"). The model generator may create a field "First Name" for the meta-model based on translating the convention into a user-friendly name. Translations can be performed using heuristics, regular expressions, or explicit conversion routines. In some implementations, the names used in the meta-model may be natural language names. A natural language or ordinary language is any language which arises, unpremeditated, in the brains of human beings. Typically, therefore, these are the languages human beings use to communicate with each other, whether by speech, signing, touch or writing. They are distinguished from constructed and formal languages such as those used to program computers or to study logic. These names may be created from unrestricted character sets that include reserved characters. A reserved character is a letter or symbol that cannot be used because it is being utilized in another location, by the database, or by the operating system. For example, many operating systems reserve the following characters: "\, /, :, *, ?, ", <, >, and |" and disallow these characters from being used. Some databases restrict the use of the space character. In some implementations, the set of restricted characters may be dependent on the underlying database or data store.

In some implementations, the model can identify one or more fields of data that serve as the default field when the object is included in a report. For example, the customer object may have "first name" and "last name" as the two default fields. In some implementations, the default field can be a formula applied to the one or more fields; for example the default field for the customer object may be the concatenation of the first name and the last name. The default fields for the order object 226 may be the order number. The default field for the product object 228 may be the product name. Each of the other objects in the model may also have default fields associated with them.

The meta-model 218 can also include information about the fields including the data type and any constraints placed on the field. For example, the customer object 218 may include a name field, which is a string, and a birth date field, which is a date.

A user may add enrichments to the meta-model. For example, represented by a dotted line in FIG. 2, a user may create a link between the customer object 218 and the product object 230. The model generator may determine the cardinality of the relationship based a navigational path between the selected objects. In this example, the customer object 210 to the order object 226 to the line item object 228 to the product object 230. Based on the relationship between these objects the model generator may determine if the relationship between the two selected objects is a one-to-one, one-to-many, many-to-one, or many-to-many relationship.

Figure 3:
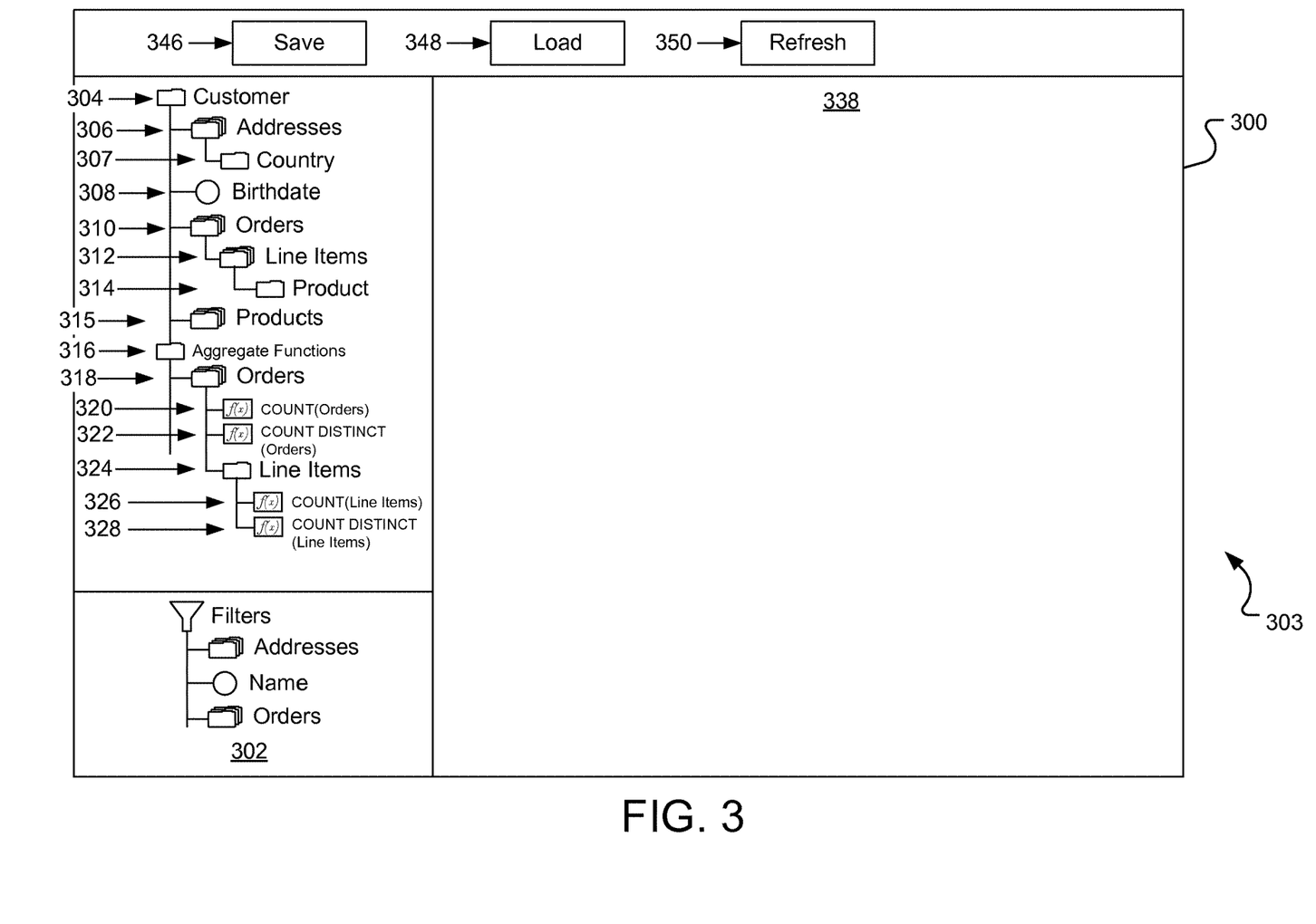
FIG. 3 illustrates an example of a user interface for building reports.

FIG. 3 illustrates an example of a user interface for building reports. In this example, on the left side 302 of the user interface are elements of the chosen object organized into a hierarchy. A user selects a starting object as the subject object of the report (in this example, the customer object 218 of FIG. 2). The subject object can be selected before the user interface is displayed or may be selected using a user interface element displayed on the user interface (not shown).

The user interface shows a hierarchy of objects using the subject object as a starting point.

Under the customer element 304 is an addresses element 306 and an orders element 310. Under the address element is a country element 307. Under the orders element is a line items element. Under the line items element 312 is a product element 314. As discussed above, in the meta-model, each relationship has a corresponding reverse relationship that allows the relationships in the meta-model to be navigated in two directions (for example, from the customer object 218 to the order object 226 and from the order object 226 to the customer object 218). In some implementations, the user interface does not display reverse relationships. For example, the customer element 304 has a nested addresses element 306, however, because the customer element 304 immediately precedes the addresses element 306 in the hierarchy, the user interface does not display a customer element under the addresses element 306. In other words, the user interface does not allow the user to navigate from customer to address and back again to customer. Because the user interface displays the address element based on navigating the meta-model from customer to address, the user interface will not navigate the relationship from address to customer. In some implementations, the user interface includes logic that prevents the presentation of circular references.

Icons in the user interface in the hierarchy can indicate the cardinality of the relationship between the two objects in the meta-model. For example, referring to FIG. 2, the model 216 indicates that one customer object 218 may be related to many orders 226; that is, the cardinality of the relationship between the customer object 218 and the order object 226 is one-to-many. Similarly, each order object 226 is associated with one customer object 218, therefore the cardinality of the relationship between the order object 226 and the customer object 218 is many-to-one. Referring again to FIG. 3, the orders data element 310 nested under the customer data element 304 is presented in the plural (e.g. "orders" as opposed to "order"). Presenting the object name in the plural reflects that a customer (the higher-level data element) is related to many orders. Furthermore, an icon can be used to provide visual indications; for example, the icon present next to the orders element 310 shows multiple folders, indicating that the customer can have multiple orders. In contrast, the product element 314 is described using a singular noun and includes an icon showing a single folder. This would indicate that each line item can have only one product.

The user interface can also display objects based on enrichment relationships in the model. For example, the products 315 element is nested under the customer element 304.

In addition to objects, the user interface can also display fields of the objects (for example, the birthdate field 308). Field names allow the user to add additional fields for an object to the report.

In some implementations, the user interface can load the entire meta-model into memory. Loading the meta-model into memory is more efficient and enables the hierarchy to be navigated in a manner not present in other report builders. For example, the user interface 300 may hold the meta-model 216 of FIG. 2 in memory. When a user expands the customer element 304, the user interface 300 refers to the meta-model 216 in order to determine how to populate the hierarchy. In this example, referring to FIG. 2, the customer object 218 is related to the order object 226 and the address object 220. Consequently, referring again to FIG. 3, the user interface adds the order element 306 and the addresses element 306 to the hierarchy nested under the customer element. Similarly, when the user expands the orders element 306, the user interface 300 may refer to the meta-model 216 of FIG. 2. In this example, referring to FIG. 2, the order object 226 is related to the line item object 228. Consequently, referring again to FIG. 3, the user interface adds the line item element 312 to the hierarchy nested under the order element 310.

Figure 4:
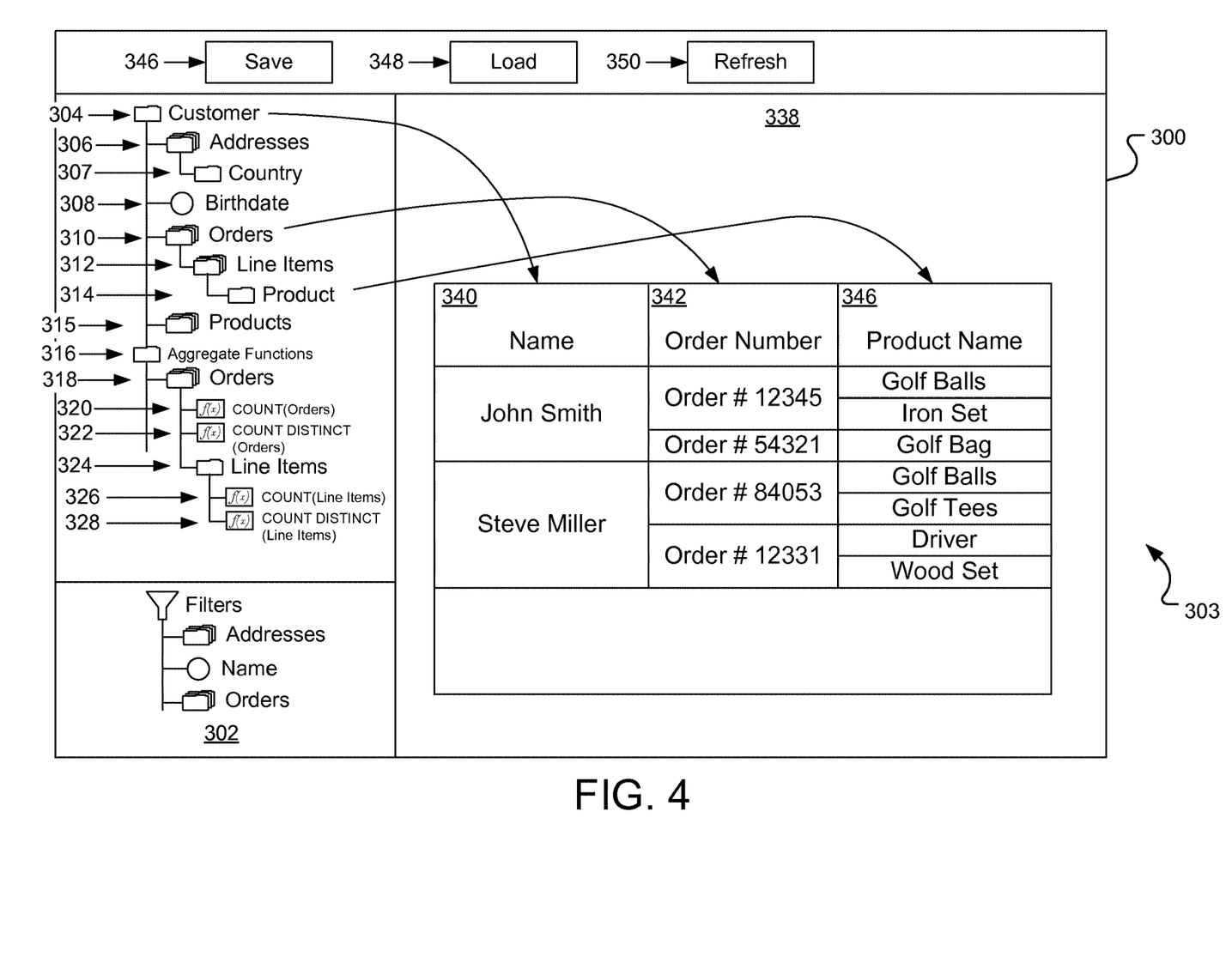
FIG. 4-6 illustrate examples of a user interface for building reports.

The user interface can also include a right side where a user may create a report, as discussed further below. Referring to FIG. 4, a user can select an element from the left side 302 of the user interface and drag it to or otherwise place the element on the right side of the user interface. Adding an element to the right side 338 of the user interface 300 generates a column in the report based on the added element. The column may include a header and data from the underlying data. For example, dragging the customer element 304 to the right side 338 of the user interface 300 generates column 340 for the report that displays the name of the customer. Similarly, dragging the orders element 310 to the right hand side 338 of the user interface 300 causes the order number column 342 to be added to the report.

For example, if a user drags the customer element 304 onto the canvas 322 on the right-hand side of the user interface 300, then the report is populated with the default field from the customer object in the underlying model. In this example, the default field is the customer name. The report can be populated in real-time or near-real-time with the values from a field or fields corresponding to the customer name default field from the rows in the customer table in the underlying data source (for example, the data source 102 of FIG. 1). In this example, the report is populated with the customer names "John Smith" and "Steve Miller."

In some implementations, an initial field may be added to the report based on its report subject.

For example, in one implementation, dragging the customer element 304 onto the canvas 322 can cause the generation and execution of the SQL statement:

SELECT CUSTOMER_TABLE.CUSTOMER_NAME FROM CUSTOMER_TABLE;

When the user drags the orders element 306 onto the canvas 322 then the report is populated with the default field from the order object; in this example, the default field for the order object is the order number 326. As described above, as soon as the order element is added to the canvas, the corresponding relationships and queries can be generated and obtained for the database. In general, objects and fields can be placed in any position in the report. For example, a user can place a new object before, after, or between existing columns. The user interface also enables the user to reorder the columns.

The values used to populate the report are taken from rows of the order table in the underlying data source, which are related to the customers that are already present in the report. In this case, the row of data in the customer table for John Smith is related to two orders: Order #12345 and Order #54321. For example, the row in the order table with the Order #12345 has a field which is a foreign key that references the primary key associated with the row in the customer table for John Smith. The row of data in the customer table for Steve Miller is associated with two rows in the order table: Order #84053 and Order #12331.

For example, in one implementation, dragging the order element 306, after customer element 304, onto the canvas 322 can cause the generation and execution of the SQL statement:

SELECT CUSTOMER_TABLE. CUSTOMER_NAME, ORDER_TABLE.ORDER_NUMBER FROM CUSTOMER_TABLE, ORDER_TABLE
WHERE CUSTOMER_TABLE.CUSTOMER ID=ORDER_TABLE.CUSTOMER_ID;

In this example, the relationship described in the WHERE clause is included between the customer element 304 and the order element 306 based on the hierarchical relationship.

Similarly, if the user drags the products element 308 onto the canvas 322, the report can be updated to display the default field for the product data object (in this case, the product name 328). In this case, the report includes the relationship between the product table and the order table based on the selection of the product element 308, which is located hierarchically under the order element 306.

In this example, Order #12345 includes two products: the golf ball and iron set. Order #54321 includes the product golf bag. Order #84053 includes two products: the golf balls and golf tees. Order #12331 includes the products driver and wood set.

The user interface provides aggregation functions to be added to the report. Aggregation functions automatically perform an operation on the values of a field. Examples of aggregation functions include COUNT, which displays the total number of rows within a field (depending on the attributes you specify). Specifically, COUNT returns the number of non-NULL values in the field; COUNTDISTINCT which displays the number of unique values in a field; MIN displays the minimum value within a field. MAX displays the largest value within a field. SUM provides a total of the value of the fields. AVG displays the average value (arithmetic mean) of a field; it sums the values in a field and divides the sum by the total number of values; and EXISTS displays a boolean value (true or false) indicating whether any non-NULL values exist in a field.

Some aggregation functions are only available for fields of different types. For example, MIN and MAX can be used with both date and numeric fields. AVG and SUM can be used only with numeric fields.

In general, aggregation functions perform operations on collection fields. A collection field is composed of a set of values on which the aggregation function can operate. The user interface makes aggregation functions available for collection fields, provided the field is valid as an aggregation function.

The user interface may only display aggregation functions that are appropriate for the field and type. For example, the user interface would not display an AVG aggregation on a string field. Determining whether an aggregation function is appropriate can include analyzing the meta-model for field name, types, and cardinality. For example, the user interface may determine that for an aggregation to be appropriate, there must be a one-to-many relationship between a given object (e.g., customer) and the object and field being aggregated (e.g., order, line item).

The user interface 300 includes an aggregation function section 316. The aggregation section can be populated based on the selected report subject of the report. In this example, the aggregation functions 316 includes an order aggregation functions 318. Under the order aggregation functions 318 is a count function of orders 320 and a count distinct of orders 322 (that is, an aggregation function that presents the number of unique values).

Additional aggregation functions can be displayed based on a further navigation of the meta-model. For example, under the orders aggregate functions 318 are line item aggregation functions 324. The line item aggregation functions include a count 326 and a count distinct 328 for the line items.

The user interface also enables the user to group columns together and add a name that straddles the grouped columns.

The user interface may also enable users to save reports (for example, by selecting a save icon 330 on the user interface). The save feature can store the selected elements, filters (discussed further below), and/or selected fields in a persistent data store (for example, a flat file system). Saving a report can include providing a name or reference that can be used to identify the saved report.

Figure 5:
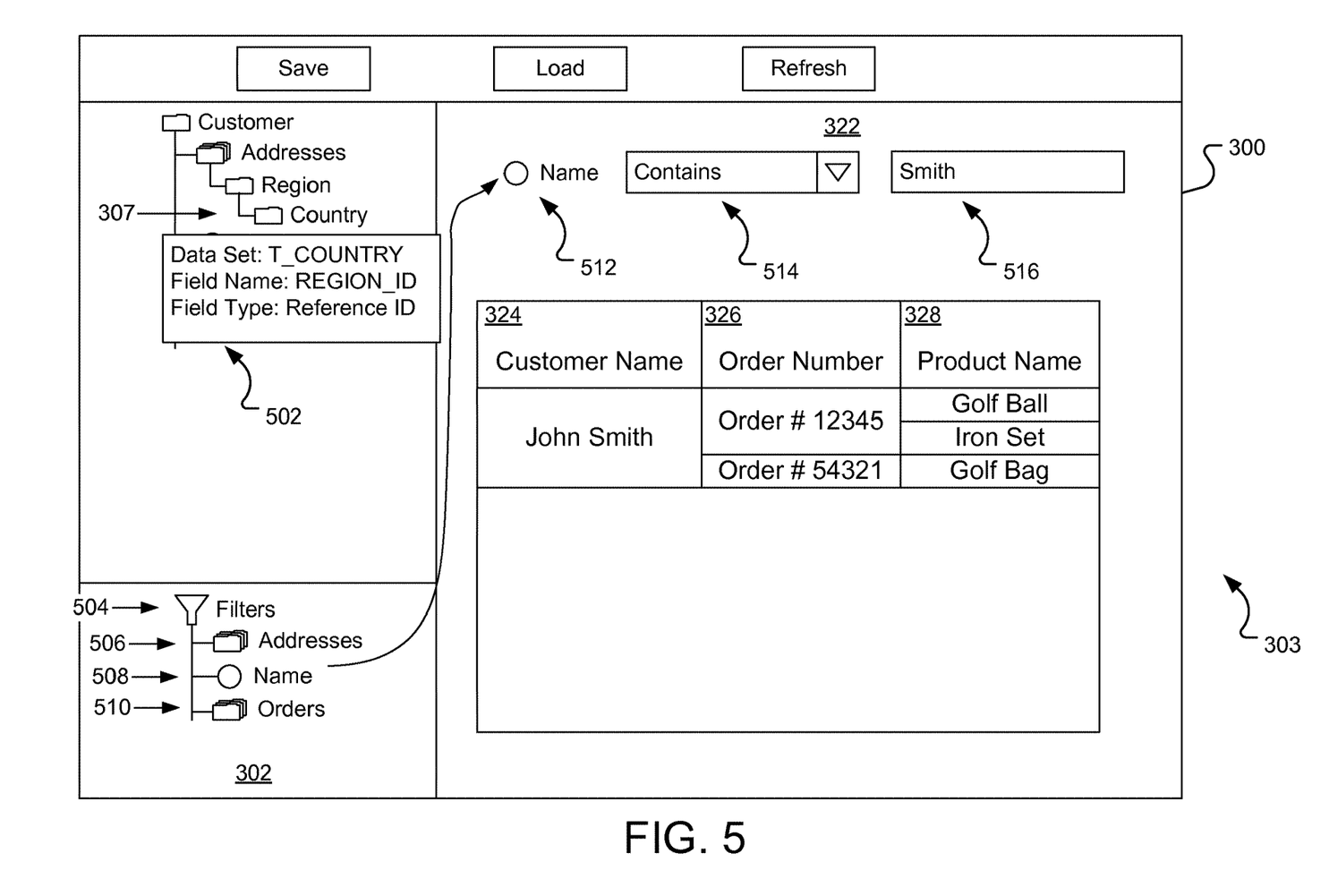

The user interface may also enable users to load the saved report (for example, by selecting a load icon 332 on the user interface). The user interface may also enable users to refresh or re-execute the report (for example, by selecting the refresh icon 334). While each of these features is described in terms of an icon, other visual representations can be used, including but not limited to, regions on a ribbon, buttons, menu selection items, etc, FIG. 5 illustrates creating an example report. The user interface 300 can display additional information about a simple field, reference field, or collection. For example, hovering over the country element 307 can cause a pop-up box 502 to appear. The pop-up box can display additional information about the country element 307, including the name of the underlying data set, the name of the corresponding field in the underlying data set, and the data type of field.

The user interface 300 can also allow a user to apply a filter to a field in the report or a field related to an object that is included in the report. For example, the user may elect to filter the customer element 304. The system may present a filter user interface area 504. The filter user interface can include a hierarchy of different fields and objects upon which the report may be filtered. For example, the filter interface area 504 includes an addresses collection 506, a name field 508, and an orders collection. If a user selects, for example, the orders collection, the orders collection may expand to present simple fields, reference fields, and collection fields associated with the order object, as described above.

The user may select an element (for example, the name element 508) and drag the element onto the right side 322 of the user interface 300, in a manner similar to selecting a field to be included in the report. The user interface may display filter information; this can include, for example, the name of the field upon which the report is to be filtered, a selection box 514 that enables the user to select a type of filter, and a value field 516 that allows the user to provide text information into the filter. Types of filters include but are not limited to determining if a field begins with a value, ends with a value, contains a value, is exactly a value, and is not a value. Some filters may be available based on data type; for example, numeric fields may include filters such as determining if the field is greater than a value or less than a value.

In this example, the user has selected the name field 508, a "contains" filter 514 and entered the term "Steve Miller" as the value 516. In response to the selection of a field, the filter operation, and a value, the report is updated to reflect the filter. For example, the report on the canvas 322 only presents orders placed by or associated with John Smith. In some implementations, filtering may occur immediately when the field and the value are selected. In other implementations, filtering may require a further action by the user. For example, the user may need to select a filter icon presented on the user interface (not shown).

Selecting a different top level element can result in the presentation and creation of different reports. For example, referring to FIG. 6, a user interface 600 for building reports. As in the example above, on the left side 602 of the user interface are elements of the chosen object organized into a hierarchy. In the example, the user has selected the product object as a subject object of the report.

Figure 6:
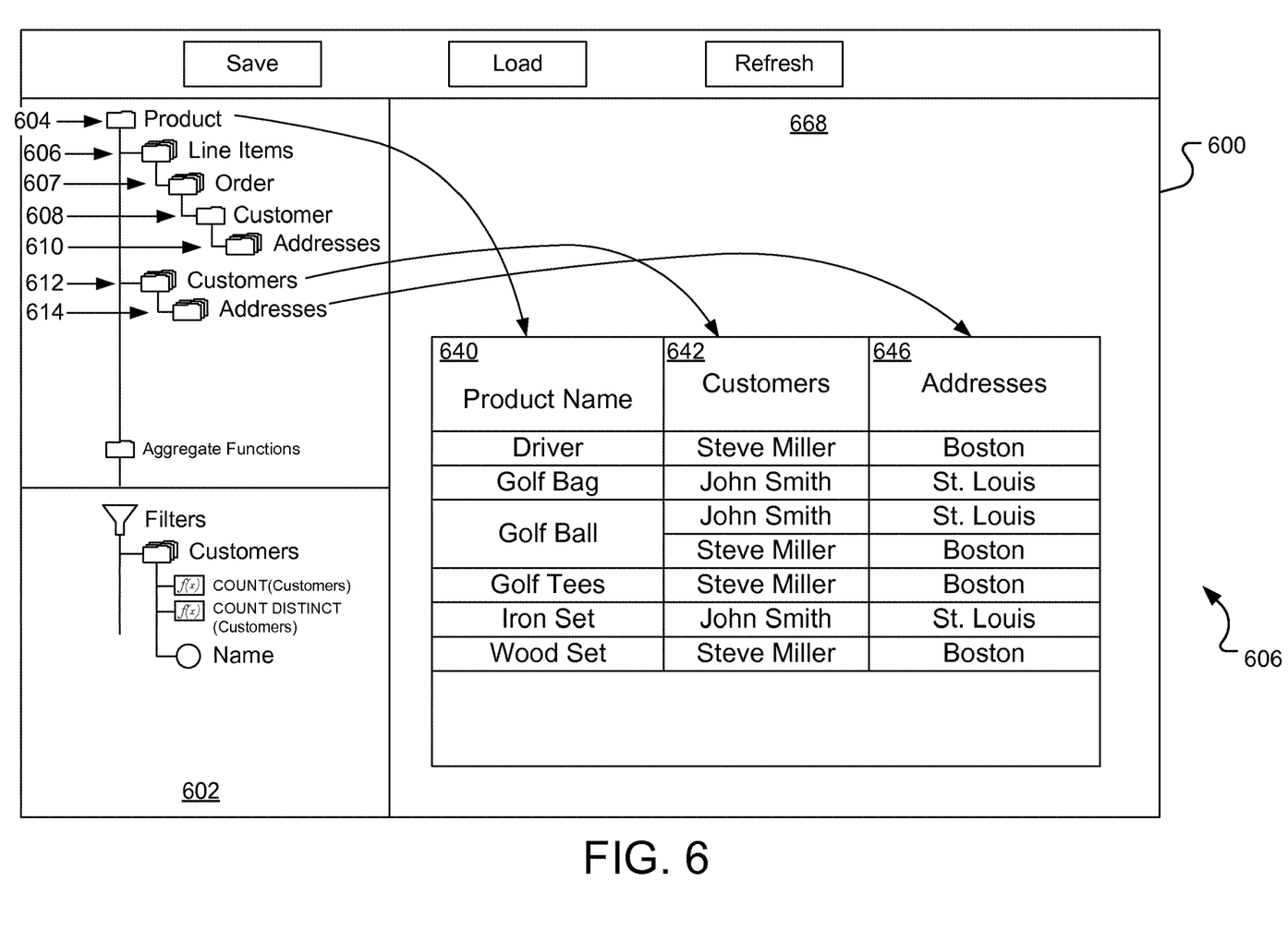

Under the product element 604 is a line item element 606 and a customers element. Under the line item element 606 is an orders element 607. Under the order element 607 is a customer element 608. Under the customer element 608 is the addresses element 610. Under the customer element 612 is the addresses element 614.

A user can select an element from the left side 602 of the user interface and drag it to or otherwise place the element on the right side of the user interface. Adding an element to the right side 668 of the user interface 600 generates a column in the report based on the added element. The column may include a header and data from the underlying data. For example, dragging the product element 604 to the right side 668 of the user interface 600 generates column 640 for the report that displays the name of the product. Similarly, dragging the customers element 612 to the right hand side 638 of the user interface 600 causes the customer column 642 to be added to the report. Alternatively, dragging the customers element 608 onto the right side 668 of the user interface 600 can have the same effect as dragging the customer element 612 to the right-hand.

Figure 7:
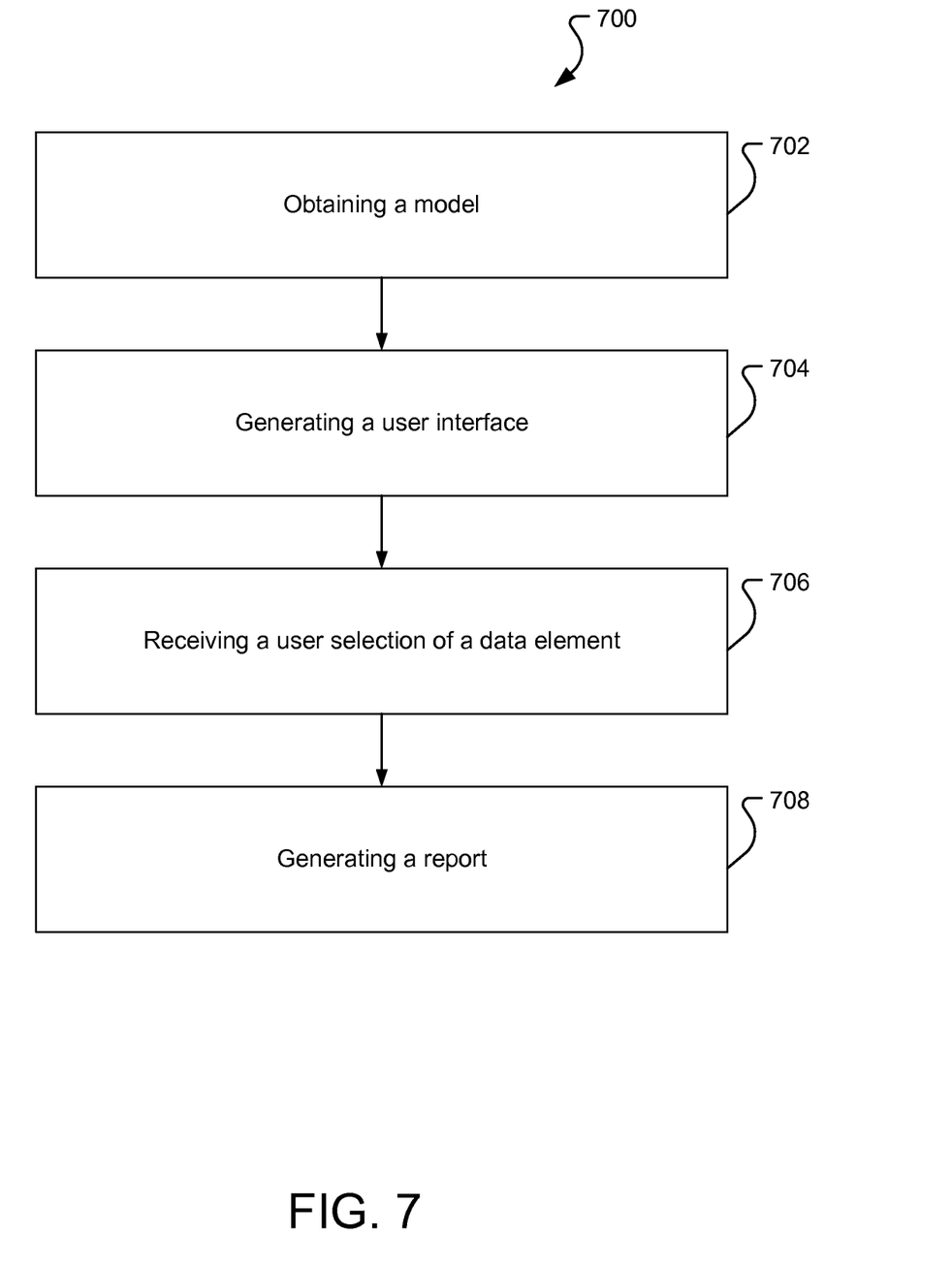
FIG. 7 is a flow chart of an exemplary process for building reports.

Dragging the addresses element 614 to the right-hand side 668 of the user interface causes the address column 646 to be added to the report. FIG. 7 is a flow chart of an exemplary process 700 for building reports. The process 700 can be performed by a computer system performing the process.

A model is obtained (702). The model can include objects representative of data structures in a data source and links between the objects representative of relationships between the data structures, with each object in the model identifying at least one default field in the corresponding data structure. The data source may be, for example, a relational database. The model may be generated from the data structures in the data source. For example, in one implementation, the model may be generated based on tables and relationships between the tables in a relational database.

For each object in the model, the model can also define a default field associated with the object. For example, a customer object may have "customer name" as a default field. The default field may correspond to one or more fields in the data structures of the data source. In some implementations, the default field may be a transformed or otherwise modified version of the data stored in the data structure. For example, the default field may be a concatenation of two or more other fields or the default field may include a data transformed into a different format.

A user interface is generated (704). The user interface includes elements organized into a hierarchy. Each element can correspond to an object in the model. The user interface can be a custom stand-alone application or a web page sent to a client device.

A user selection of an element is received (706). A user may select an element by, for example, clicking on the element, double clicking, dragging the element from the hierarchy onto a canvas, tapping a touch based user interface, or through any other selection mechanism.

A report is generated (708). To generate the report, the process can identify an object of the model corresponding to the element. For example, if a user selects an element labeled "Customer", the process may identify a customer object as the requested object. The process can identify a data structure corresponding to the object. For example, the process may identify that the CUSTOMER_TABLE is associated with the customer object in the model. The process can obtain data from at least one default field in the identified data structure in the data source. For example, if the customer name is the default field associated with the customer object, the process can obtain the customer name data from customer data structure in the data source.

The data is presented to the user. The data may be presented without requiring a subsequent or intervening action from the client. The data may be presented as a tabular report or may be otherwise transformed or modified. For example, the data may be aggregated, parsed, charted, put into buckets or otherwise modified before being presented.

Figure 8:
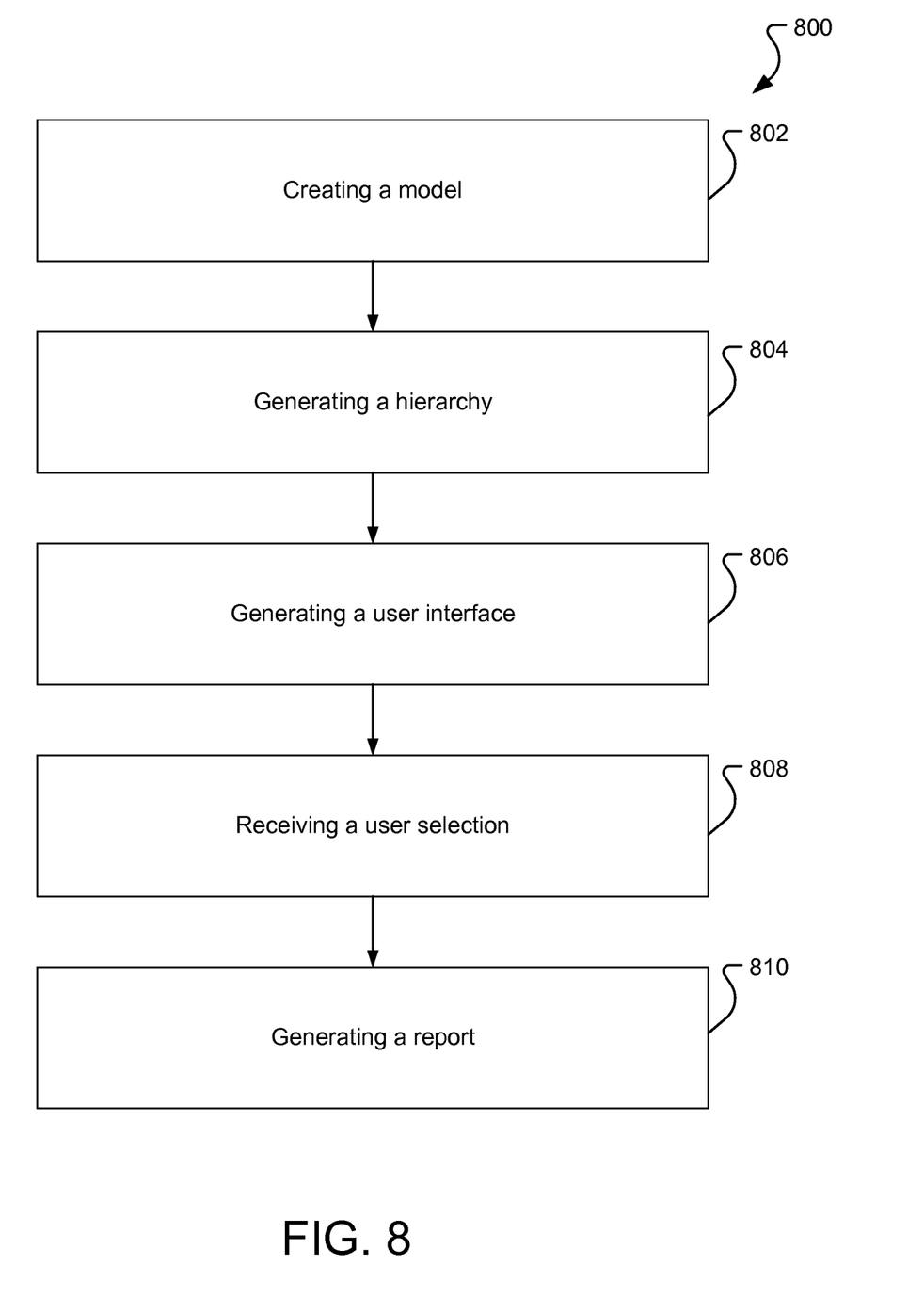
FIG. 8 is a flow chart of an exemplary process for building reports.

FIG. 8 is a flow chart of an exemplary process 800 for building reports. The process 800 can be performed by a computer system performing the process.

A model is created (802). The model can be created based on structured data (for example, a database schema of a relational database). The structured data can include data structures having data elements (for example, tables). Each data element can have named fields.

Creating the model can include creating an object in the model based on one of the data structures in the structured data. Translating a name of a field in the structure to a natural language name. Translating the name of the field can be performed using a look up table, heuristics, a conversion function, of through any other transformation mechanism.

A field is created on the object having the natural language name.

Creating a model also includes creating a relationship field that represents a relationship between two data structures in the structured data. For example, a relationship field can be created based on a primary key—foreign key relationship in a relational database. The relationship field may be a collection representing that in some relationships multiple objects may be associated with a single object.

A hierarchy of objects in the model is generated (804). The hierarchy can be generated by organizing the objects with respect to a starting object. In some scenarios, the starting object can be selected by a user interacting with a user interface.

A user interface including elements for one or more of the objects in the hierarchy is generated (806). The user interface can include user interface elements representing the objects in the model. The user interface elements organized according to the hierarchy. The user interface can enable a user to create a report and filter the report using the natural language name. The user interface may also include aggregation functions and filtering functions. Aggregation functions enable a user to aggregate information about a field. Filter functions enable a user to restrict values presented in the report.

A selection of one or more elements from the user can be received (808). The user may select the elements, for example, by dragging and dropping the elements from one portion of a screen to another portion of the screen.

A report is be generated (808). To generate the report a system may identify a data structure corresponding to a selected element. Obtain data from at least one field in the identified data structure. And present the data to the user. The report can be generated using a WYSIWYG interface. For example, a user may add a field to the report and the report may refresh and show the values from a data source. This enables the user to get immediate feedback about the quality of the report allowing rapid iterations.

The report building approach described above can be implemented using a computing system executing suitable software. For example, the software may include procedures in one or more computer programs that execute on one or more programmed or programmable computing systems (which may be of various architectures, such as distributed, client/server, or grid), each including at least one processor, at least one data storage system (including volatile and/or non-volatile memory and/or storage elements), and at least one user interface (for receiving input using at least one input device or port, and for providing output using at least one output device or port). The software may include one or more modules of a larger program, for example, that provide services related to the design, configuration, and execution of dataflow graphs. The modules of the program (e.g., elements of a dataflow graph) can be implemented as data structures or other organized data conforming to a data model stored in a data repository.

The software may be provided on a tangible, non-transitory medium, such as a CD-ROM or other computer-readable medium (e.g., readable by a general or special purpose computing system or device), or delivered (e.g., encoded in a propagated signal) over a communication medium of a network to a tangible, non-transitory medium of a computing system where it is executed. Some or all of the processing may be performed on a special purpose computer or using special-purpose hardware (such as coprocessors or field-programmable gate arrays (FPGAs) or dedicated, application-specific integrated circuits (ASICs)). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured that it causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A computer implemented method including:
   accessing, by a computing system, data structures that are derived either from an underlying data source or from a specification that describes the underlying data source, with the data structures including data elements that have fields and field names;
   producing by the computing system from the data structures, a meta-model that is based on the data structures, with producing the meta-model further including:
      producing by the computing system from the data structures, objects in the meta-model, which objects represent the data structures, and with producing a given one of the objects for a given data structure including:
         translating a field name of a field in the given data structure to a second name; and
         producing, on the given one of the objects, a field having the translated second name;
      producing a relationship between the given one of the objects and another one of the objects based on a foreign key in the underlying data source, which foreign key defines a relationship between the given data structure and at least one other of the data structures, and a reverse relationship between the given one of the objects and the other one of the objects, with the relationship and the reverse relationship enabling bi-directional navigation between the given one of the objects and the other one of the objects in the meta-model;
   generating a user interface that renders a first plurality of elements that use second names representing corresponding objects;
   receiving a first user selection of an element from the first plurality of elements;
   causing the computing system to process the first user selected element by reference to the meta-model and the produced relationships to generate a hierarchy by determining how to organize the objects in the meta-model;
   rendering, in the user interface, a second plurality of elements in accordance with the generated hierarchy;
   receiving a second user selection of an element from the second plurality of elements;
   based on the received second user selection, identifying a relationship between data structures represented by objects in the meta-model; and
   updating the user interface based on the identified relationship.

2. The method of claim 1, wherein the second name is a natural language name, and wherein the method further includes translating the field name to the natural language name using a look up table.

3. The method of claim 1, wherein the relationship is a reference field representing a relationship between one data element in a data structure to one second data element in another data structure.

4. The method of claim 1, wherein the relationship is a collection field representing a relationship between one data element in a first data structure to second data elements in a second data structure.

5. The method of claim 4, wherein the user interface includes aggregation functions that can be used on the collection field.

6. The method of claim 1, wherein the relationship is a parent-child field representing a relationship between one data element in a data structure to a second data element in the data structure.

7. The method of claim 1, wherein a data structure is a table in a structured database.

8. The method of claim 1, wherein a data structure is one or more files.

9. The method of claim 1, further including:
   causing the user interface to generate one or more columns in a report, with the one or more columns corresponding to selected one or more elements specified by the user selection.

10. The method of claim 1, wherein the user interface enables an interactive production of one or more reports, which interface provides visual feedback including data values in near-real-time prior to finalizing the one or more reports.

11. The method of claim 1, wherein receiving the user selection of an element from the elements occurs through the user interface.

12. The method of claim 1, wherein the computing system includes a processor and memory operatively coupled to the processor, and the method further includes:
   loading the meta-model into a memory of the computing system.

13. The method of claim 1, further including:
  identifying that two or more elements rendered in the graphical user interface are moved onto a canvas portion of the user interface;
  generating and executing one or more SQL statements to retrieve data associated with underlying data structures represented by objects corresponding to the two or more elements moved onto the canvas portion, wherein at least one SQL statement describes a relationship between the two or more elements represented in the generated hierarchy of the meta-model; and
  updating the canvas portion to display values of the retrieved data associated with the underlying data structures represented by the objects corresponding to the two or more elements on the canvas portion, and a relationship between those underlying data structures based on organization in the hierarchy of the objects representing those underlying data structures.

14. The method of claim 1, further including:
  rendering, in the user interface, an aggregation function section for display of one or more aggregation functions for the plurality of elements, with an aggregation function specifying an operation to be performed on values of one or more fields of one or more objects in the meta-model; and
  populating the aggregating function section with one or more aggregation functions that are made available based on an organization of objects with fields in the generated hierarchy and based on analyzing the meta-model for field names, types, and cardinality;
  wherein selection of an aggregation function causes performance of an operation on values of one or more fields and display of new data that is distinct from the meta-model.

15. A non-transitory computer storage medium encoded with computer program instructions that when executed by one or more computers cause the one or more computers to perform operations comprising:
  accessing data structures that are derived either from an underlying data source or from a specification that describes the underlying data source, with the data structures including data elements that have fields and field names;
  producing from the data structures, a meta-model that is based on the data structures, with producing the meta-model further including:
    producing from the data structures, objects in the meta-model, which objects represent the data structures, and with producing a given one of the objects for a given data structure including:
      translating a field name of a field in the given data structure to a second name; and
      producing, on the given one of the objects, a field having the translated second name;
    producing a relationship between the given one of the objects and another one of the objects based on a foreign key in the underlying data source, which foreign key defines a relationship between the given data structure and at least one other of the data structures, and a reverse relationship between the given one of the objects and the other one of the objects, with the relationship and the reverse relationship enabling bi-directional navigation between the given one of the objects and the other one of the objects in the meta-model;
  generating a user interface that renders a first plurality of elements that use second names representing corresponding objects;
  receiving a first user selection of an element from the first plurality of elements;
  causing the one or more computers to process the first user selected element by reference to the meta-model and the produced relationships to generate a hierarchy by determining how to organize the objects in the meta-model;
  rendering, in the user interface, a second plurality of elements in accordance with the generated hierarchy;
  receiving a second user selection of an element from the second plurality of elements;
  based on the received second user selection, identifying a relationship between data structures represented by objects in the meta-model; and
  updating the user interface based on the identified relationship.

16. The non-transitory computer readable medium of claim 15, wherein the operations further include translating the field name to the natural language name using a look up table.

17. The non-transitory computer readable medium of claim 15, wherein the relationship is a reference field representing a relationship between one data element in a data structure to one second data element in another data structure.

18. The non-transitory computer readable medium of claim 15, wherein the relationship is a collection field representing a relationship between one data element in a first data structure to second data elements in a second data structure.

19. The non-transitory computer readable medium of claim 18, wherein the user interface includes aggregation functions that can be used on the collection field.

20. The non-transitory computer readable medium of claim 15, wherein the relationship is a parent-child field representing a relationship between one data element in a data structure to a second data element in the data structure.

21. The non-transitory computer readable medium of claim 15, wherein a data structure is a table in a structured database.

22. The non-transitory computer readable medium of claim 15, wherein a data structure is one or more files.

23. The non-transitory computer readable medium of claim 15, wherein the operations further include:
  causing the user interface to generate one or more columns in a report, with the one or more columns corresponding to selected one or more elements specified by the user selection.

24. The non-transitory computer readable medium of claim 15, wherein the user interface enables an interactive production of one or more reports, which interface provides visual feedback including data values in near-real-time prior to finalizing the one or more reports.

25. The non-transitory computer readable medium of claim 15, wherein receiving the user selection of an element from the elements occurs through the user interface.

26. The non-transitory computer readable medium of claim 15, wherein a computer is a computing system including a processor and memory operatively coupled to the processor, and the operations further include:
  loading the meta-model into memory of the computing system.

27. A system comprising:
one or more computers and one or more storage devices storing instructions that are operable, when executed by the one or more computers, to cause the one or more computers to perform operations comprising:
  accessing data structures that are derived either from an underlying data source or from a specification that describes the underlying data source, with the data structures including data elements that have fields and field names;
  producing from the data structures, a meta-model that is based on the data structures, with producing the meta-model further including:
    producing from the data structures, objects in the meta-model, which objects represent the data structures, and with producing a given one of the objects for a given data structure including:
      translating a field name of a field in the given data structure to a second name; and
      producing, on the given one of the objects, a field having the translated second name;
  producing a relationship between the given one of the objects and another one of the objects based on a foreign key in the underlying data source, which foreign key defines a relationship between the given data structure and at least one other of the data structures, and a reverse relationship between the given one of the objects and the other one of the objects, with the relationship and the reverse relationship enabling bi-directional navigation between the given one of the objects and the other one of the objects in the meta-model;
  generating a user interface that renders a first plurality of elements that use second names representing corresponding objects;
  receiving a first user selection of an element from the first plurality of elements;
  causing the one or more computers to process the first user selected element by reference to the meta-model and the produced relationships to generate a hierarchy by determining how to organize the objects in the meta-model;
  rendering, in the user interface, a second plurality of elements in accordance with the generated hierarchy;
  receiving a second user selection of an element from the second plurality of elements;
  based on the received second user selection, identifying a relationship between data structures represented by objects in the meta-model; and
  updating the user interface based on the identified relationship.

28. The system of claim 27, wherein the operations further include translating the field name to the natural language name using a look up table.

29. The system of claim 27, wherein the relationship is a reference field representing a relationship between one data element in a data structure to one second data element in another data structure.

30. The system of claim 27, wherein the relationship is a collection field representing a relationship between one data element in a first data structure to second data elements in a second data structure.

31. The system of claim 30, wherein the user interface includes aggregation functions that can be used on the collection field.

32. The system of claim 27, wherein the relationship is a parent-child field representing a relationship between one data element in a data structure to a second data element in the data structure.

33. The system of claim 27, wherein a data structure is a table in a structured database.

34. The system of claim 27, wherein a data structure is one or more files.

35. The system of claim 27, wherein the operations further include:
  causing the user interface to generate one or more columns in a report, with the one or more columns corresponding to selected one or more elements specified by the user selection.

36. The system of claim 27, wherein the user interface enables an interactive production of one or more reports, which interface provides visual feedback including data values in near-real-time prior to finalizing the one or more reports.

37. The system of claim 27, wherein receiving the user selection of an element from the elements occurs through the user interface.

38. The system of claim 27, wherein the system includes a processor and memory operatively coupled to the processor, and the operations further include:
  loading the meta-model into memory of the system.

* * * * *

UNITED STATES PATENT AND TRADEMARK OFFICE
CERTIFICATE OF CORRECTION

| | | |
|---|---|---|
| PATENT NO. | : 11,288,290 B2 | Page 1 of 1 |
| APPLICATION NO. | : 14/717633 | |
| DATED | : March 29, 2022 | |
| INVENTOR(S) | : Dusan Radivojevic and Peter Moss | |

It is certified that error appears in the above-identified patent and that said Letters Patent is hereby corrected as shown below:

On the Title Page

Item (57) "ABSTRACT", Line 8, delete "the with" and insert -- with --

Signed and Sealed this
Thirty-first Day of May, 2022

Katherine Kelly Vidal
*Director of the United States Patent and Trademark Office*